Patented Feb. 11, 1930

1,746,532

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF PRODUCING CYMENE

No Drawing.   Application filed July 26, 1928. Serial No. 295,615.

My invention relates to a method for the production of para-cymene, and more particularly relates to the production of para-cymene by the proper treatment of dipentene or other terpenes.

In accordance with my invention, I effect the production of cymene by treatment of dipentene, pinene, or other terpenes with heat in the presence of a catalyst. As a result of the treatment polymerization products, saturated hydrocarbons and cymene $C_{10}H_{14}$, are produced. The cymene may be readily separated from the polymerization products by fractionation and it may also be separated by chemical treatment from saturated hydrocarbons, as para-menthane, $C_{10}H_{20}$, which may be formed.

In accordance with my invention, I may utilize as a catalyst, for example, fuller's earth, kieselguhr, and the like. The dipentene, or other terpenes, may be treated in either the liquid or vapor phase.

In accordance with my invention the para-cymene, formed by the treatment of the dipentene, or other terpenes, may be readily separated by fractionation from the higher boiling polymerization products formed by the treatment; and while the crude cymene on separation from the polymerization products may be generally used in place of pure cymene, for example, for certain solvent purposes, separation of the cymene from other products, as para-menthane and possibly small amounts of other saturated hydrocarbons formed by the treatment may be effected, for example, in the form of the barium salt of its sulfonic acid by sulfonation of the cymene with sulfuric acid by known methods, the menthane being unattacked, or separation may be effected by nitration of the crude cymene with mixed acid, since the cymene nitrates more readily than does the para-menthane.

In the carrying out of the process according to my invention, say 305 parts of terpenes, b. p. 170° C.–185° C. are heated under a reflux condenser with 75 parts of fuller's earth at a temperature within about the range 170° C.–200° C. for a period of ten hours. After the treatment is completed, about 125 parts of crude cymene is obtained by fractionation from a residual oil consisting chiefly of polymerized terpenes.

The crude product obtained according to the procedure outlined above will contain para-cymene, para-menthane and also a large proportion of polymerized terpenes. If desired the process may be carried out at a higher temperature, say within the range 190° C.–250° C. under increased pressure, say a pressure within about the range 40–130 pounds per square inch, with, however, the production of cymene and saturated hydrocarbons in proportions differing from those obtained at lower temperatures.

In the carrying out of the method in accordance with my invention, the heating of, for example, dipentene in the presence of a catalyst, as fuller's earth, about two-thirds of the dipentene is converted into high boiling polymers $(C_{10}H_{16})_x$ distilling above 300° C. while the remainder of the dipentene, at the same time, undergoes simultaneous hydrogenation and dehydrogenation with the formation of para-cymene and para-menthane. The reaction resulting in the formation of para-cymene and para-menthane may be represented thus:

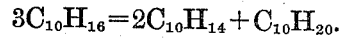
$$3C_{10}H_{16} = 2C_{10}H_{14} + C_{10}H_{20}.$$

In the reaction it will be noted that three molecules of dipentene yield two molecules of para-cymene and one molecule of para-menthane. In addition to para-menthane small amounts of other saturated hydrocarbons may be formed and the relative proportions of para-cymene and para-menthane as well as of the other saturated hydrocarbons may be influenced somewhat by the reaction temperature.

As a further illustration of the carrying out of my method as applied, for example, to the treatment of dipentene, say 400 parts of dipentene are refluxed for ten hours with 100 parts of fuller's earth at a temperature of about 190° C.–200° C. under a pressure of about 40–50 pounds. The treatment in addition to higher polymers will yield about 160 parts of non-polymerized oil distilling below about 250° C. and which on fractionation will yield a major proportion distilling between about 170° C. and 185° C., having a specific gravity of about 0.846 at 15.6° C., and consisting essentially of para-cymene with some para-menthane.

The operation may also be conducted at higher temperatures e. g. about 240° C.–250° C. for 6 hours under 110–130 pounds gauge pressure, yielding a crude product which has a sp. gr. of .885 with 50% distilling between about 160° C. and 195° C.

The crude product produced in accordance with my process will, as has been indicated, comprise para-cymene, para-menthane, and polymerized terpenes and more specifically the product may contain about 25% para-cymene, 15% para-menthane, and 60% polymerized terpenes. The crude product will, on fractionation, yield a product boiling largely within the range 170° C.–185° C., having a specific gravity of about 0.846 at 15.6° C. and comprising chiefly para-cymene and para-menthane.

The method in accordance with my invention may be carried out with the dipentene, or other terpenes, in liquid or vapor phase. The conversion in vapor phase may be effected, for example, by passing vapors of the dipentene, or other terpenes, over fuller's earth heated to a temperature within about the range 200° C.–300° C.

The crude product, as originally produced, may be utilized in general in place of cymene, but if it is desired to separate the cymene; such may be accomplished by treatment of the crude product, i. e. that portion boiling between about 170° C. and 185° C. with sulphuric acid for the production of the sulfonic acid of the cymene, which is easily separated from the unattacked menthane. For example, separation of the cymene may be effected by sulfonation of say 100 parts of the crude product with 200 parts of sulfuric acid and subsequent separation of the barium salt. If desired, separation of the cymene from the crude cymene may be effected by nitration of the crude cymene with mixed acid, since the cymene will nitrate more readily than will the para-menthane.

According to my invention cymene is produced in a relatively simple and inexpensive manner, the product as produced being neutral and adapted for use in crude form or capable of being readily separated into para-menthane and cymene derivatives.

It will be understood that where in the claims appended hereto I specify fuller's earth, I intend to include kieselguhr and other silicious and argillaceous earths as equivalents.

Having now fully described my invention, what I claim and desire to protect by Letters Patent is:

1. The method of producing cymene which includes subjecting a terpene to heat in the presence of fuller's earth to effect the conversion of a part thereof into cymene.

2. The method of producing cymene which includes subjecting dipentene to heat in the presence of fuller's earth to effect the conversion of a part thereof into cymene.

3. The method of producing cymene which includes subjecting dipentene to heat in the presence of fuller's earth to effect partial conversion into cymene, fractionating the product and collecting the fraction boiling below about 200° C. and consisting in substantial part of para-cymene.

4. The method of producing cymene which includes subjecting dipentene to heat in the presence of fuller's earth to effect partial conversion into cymene, fractionating the product, collecting the fraction boiling below about 195° C. and consisting in substantial part of para-cymene and subjecting the fraction to sulfonation for the separation of para-cymene.

In testimony of which invention, I have hereunto set my hand at Kenvil, N. J., on this 23rd day of July, 1928.

IRVIN W. HUMPHREY.